United States Patent Office 3,385,594
Patented May 28, 1968

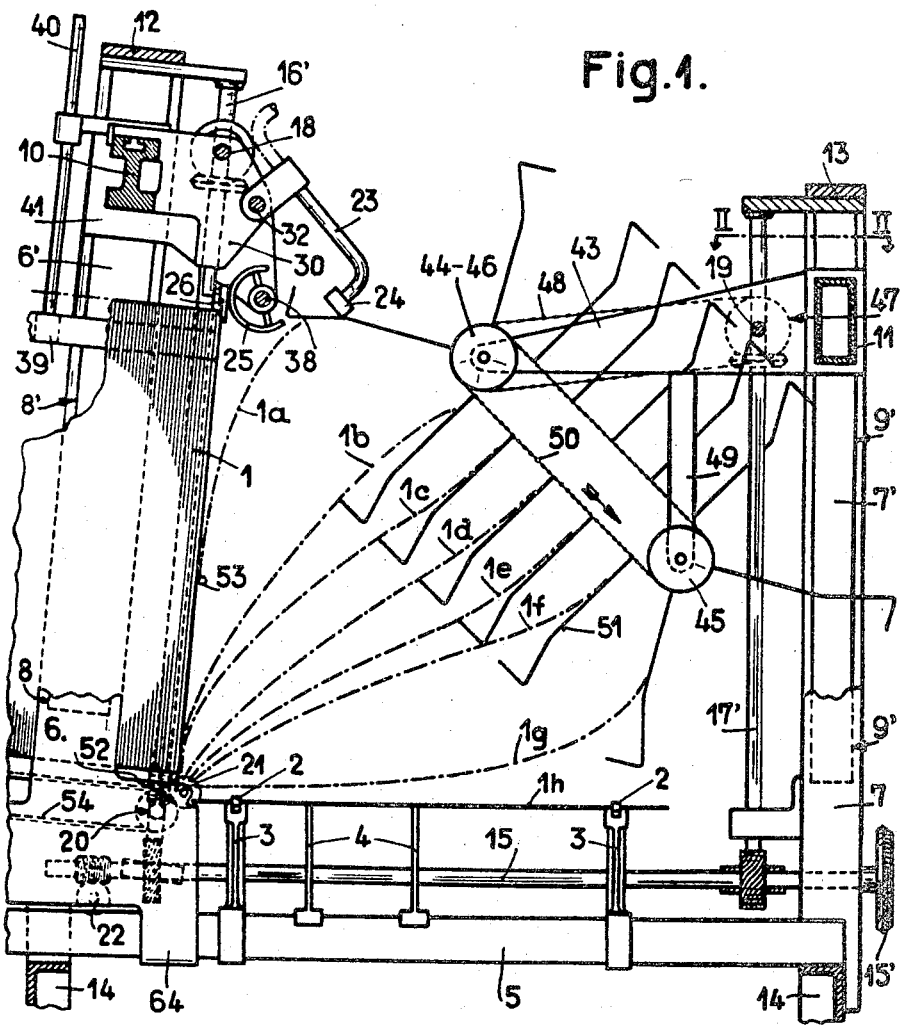

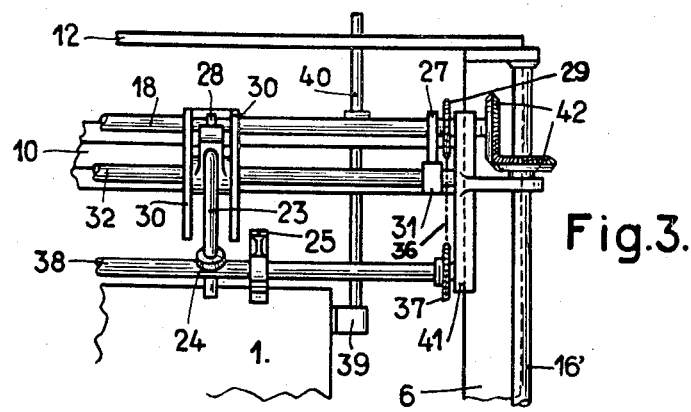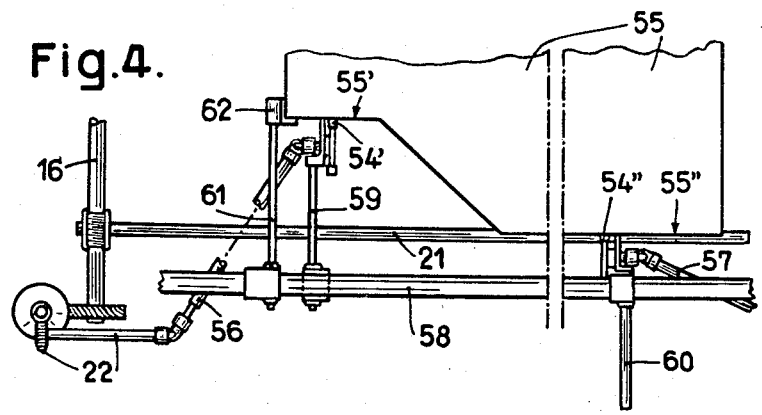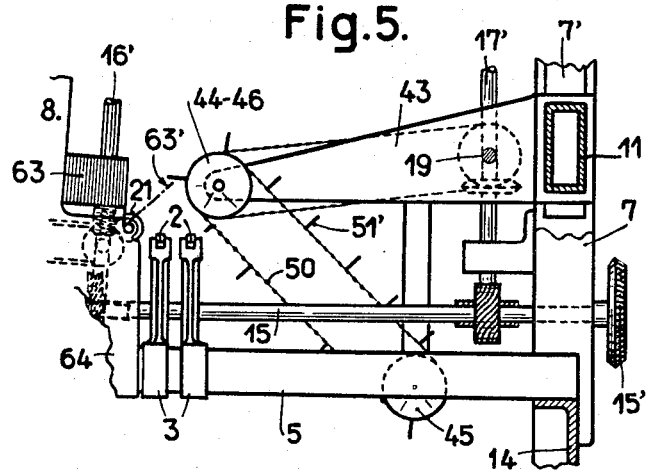

3,385,594
DEVICE FOR SUCCESSIVELY FEEDING SHEETS TO A CONVEYOR FROM A PILE IN WHICH THE SHEETS ARE SUPPORTED ON EDGE
Roland Preisig, Lausanne, Switzerland, assignor to J. Bobst et Fils S.A., Lausanne, Switzerland
Filed Feb. 13, 1967, Ser. No. 615,605
Claims priority, application Switzerland, Feb. 14, 1966, 2,191/66
14 Claims. (Cl. 271—12)

ABSTRACT OF THE DISCLOSURE

A feeder device in which a pile of sheets are supported on edge such that the sheets are slightly inclined with the vertical, the first sheet in said pile being successively removed from the pile by a separating mechanism which is inclusive of a suction device. The first sheet is engaged at its upper edge by the separating mechanism and withdrawn from the pile by being tilted about its lower edge until it reaches a position in which it can freely fall, at which time the sheet is released and supported by a blade member on an endless conveyor and gradually lowered to horizontal position onto a conveyor means which transports the sheets one by one to a processing machine.

Brief summary of invention

In machines processing sheet material such as paper or cardboard, as for instance folding-glueing machines, it is usual to withdraw the material sheet by sheet from a reserve pile, each sheet being simultaneously fed and introduced into the machine.

Such piles are generally set up in vertical configuration at the end of the machine, the sheets being removed from the top or bottom of the pile.

It has been proposed to lay the pile sidewise and to turn the sheets withdrawn from one of its ends in order to feed and introduce the sheets into the machine in horizontal attitude.

The present invention is directed to a feeder of this latter type.

The feeder according to the invention is characterized by the provision of a suction mechanism for seizing each sheet successively near its upper edge and for turning it through a predetermined angle around the lower edge thereof, at least one endless conveying member having a series of arms protruding therefrom driven by two rotatable members in a vertical plane, the upper rotatable member being closer to the pile than the lower rotatable member, the arrangement being such that the arms engage successive sheets by their upper edges, and lower them into a horizontal conveying plane where feeding tappets engage the sheets and lead them to the sheet processing machine. The suction mechanism, the conveying member and feeding tappets are driven in synchronism from a common driving means while, with a view to make it possible to operate with various sheet sizes, the height of both the rotary members and that of the suction mechanism are adjustable as are the spacing of the feeding tappets, the distance of the pile face from where the sheets are withdrawn and the distance of the suction mechanism to the endless conveying member, which itself is laterally displaceable.

Brief description of the drawing

FIGURE 1 is a diagrammatic illustration of a feeder in side elevation;

FIGURE 2 is a sectional view taken along line II—II in FIG. 1;

FIGURE 3 is a front view in elevation of a suction mechanism of the feeder;

FIGURE 4 is a front view in elevation of the lower part of the pile and its support for the case of a particular profile of the sheets;

FIGURE 5 is a view similar to that of FIG. 1, showing the arrangement for very small-size sheets;

Detailed description of the invention

Figure 6:
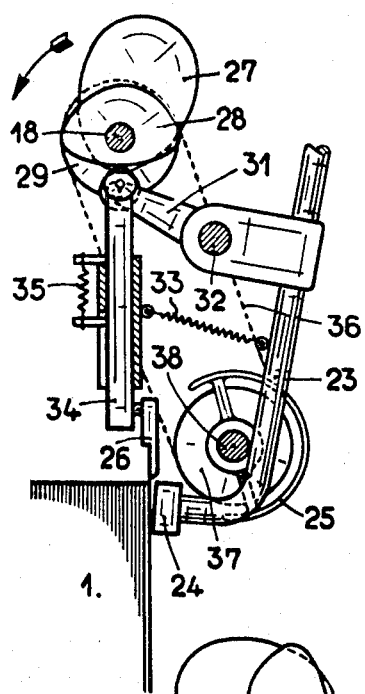
FIGURES 6–10 are side views of the suction mechanism in different and successive working positions.

In FIG. 1 there is shown a pile 1 of sheets, for instance of cardboard, placed on edge, so that the sheets form a slight angle with the vertical so that they would tend to fall forward if released. Each sheet is adapted to perform a tipping or tilting motion until it is placed horizontally at 1h, after having successively passed through the positions 1a, 1b, 1c, 1d, 1e, 1f and 1g.

Once in horizontal position, the sheets are fed by the tappets 2 of an endless conveying member, of which only the upper portion is seen. The conveying member moves in a direction into the plane of the drawing and perpendicular thereto. These tappets 2 pass over guiding supports 3, while other supports 4 sustain the sheets.

The assembly of the members enabling the above displacements of the sheets is supported by a framework comprising mainly cross girders 5 and vertical girders constituted by respective girder members 6, 6' and 7, 7' which are in spaced relation along the length of the conveying member. The girder 6, 6' is slightly inclined to provide the inclination of the plane of the sheets.

The girders are of rectangular section and have facing surfaces with longitudinal dovetail guides such as 8, 8', 9, 9' (FIGS. 1 and 2) allowing cross girders 10 and 11 to join them at an adjustable height of girder members 6, 6' and 7, 7' respectively. At the base, the assembly rests on elements 14, which for example are integral with the framework of a machine processing the fed sheets.

Located at the base of the machine is a main drive shaft 15, driven by a gear 15', which is driven synchronously with the machine processing the supplied sheets.

The shaft 15 drives vertical shafts such as 16' and 17', extending parallel to the vertical girders and which drive in turn horizontal shafts 18 and 19 extending parallel to the cross girders 10 and 11 with which they are, as will appear later, shifted vertically.

The shaft 15 drives directly or indirectly a lower horizontal shaft 20, a small cylinder 21 and a member 22. All these drive connections are realized by gears, helicoidal wheels or worms which have not been disclosed in detail in order to avoid complicating the drawing.

It is to be noted that several of the above drive connections, as well as other members borne by the various shafts already mentioned, can slide along the latter while being rotatively driven, which presumes the presence of grooves and keys not shown, due to the small scale of the drawing. These functions will appear in the course of the description.

To achieve separation, tipping and the horizontal setting of the sheets, the feeder represented comprises two mechanisms which will now be described separately.

The first one, supported by cross girder 10 is a sheet separating mechanism, which is visible in side view in FIG. 1, in front view in FIG. 3, and in detail, to a larger scale, in FIGS. 6–10 in different working positions.

This mechanism comprises an oscillating arm 23 with a suction or cupping duct or vent 24, a rotative sheet separating segment 25, a sheet catching finger 26 and cams 27 and 28. The cam 28, as well as a chain wheel 29, are mounted slidably on cross shaft 18. The cam 28 and arm 23 are arranged between two platens 30. Through a lever 31 driving an auxiliary cross shaft 32 parallel with the shaft 18, the cam 27 causes the arm 23 to oscillate in conjunction with the action of a return spring 33.

The other cam 28 actuates a rod or stem 34 against the action of a return spring 35, rod 34 being guided between the platens 30 and bearing, on its lower end, a finger 26 which is alternatively lowered and raised.

The shaft 18 drives a second transverse shaft 38, extending parallel to shafts 18 and 32 and bearing segment 25, via a chain wheel 29, a chain 36 and a second chain wheel 37.

The arm 23 which is hollow, is connected by a flexible pipe (not shown) to a vacuum pump or the like with a valve being interposed for governing the aspiration and resting time. Thereby, the vent 24 will be effective to produce suction.

The described mechanism operates as follows:

In a starting position (FIG. 6) the suction vent 24 is applied against the first sheet of the pile 1, near its upper edge. The finger 26 is lifted so that the first sheet is free. The segment 25 is oriented with its opening facing the sheet edge, its trajectory being practically tangent to the latter.

Figure 7:
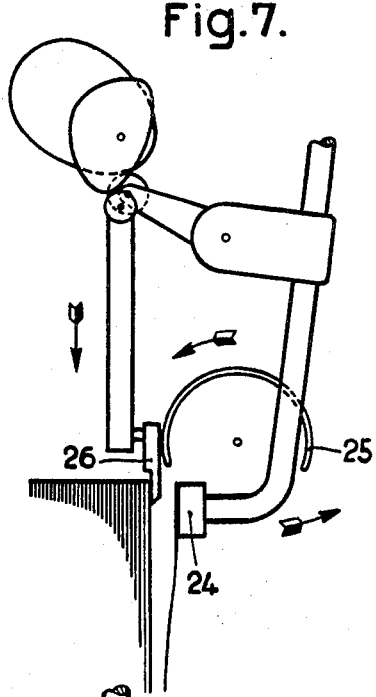
Figure 8:
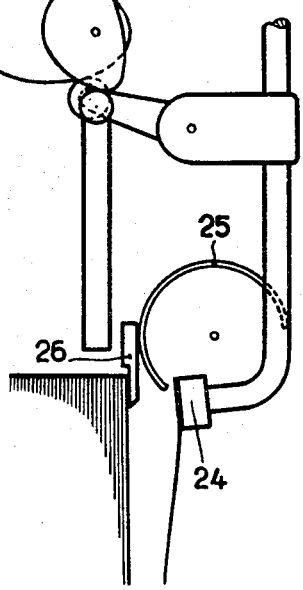
Figure 9:
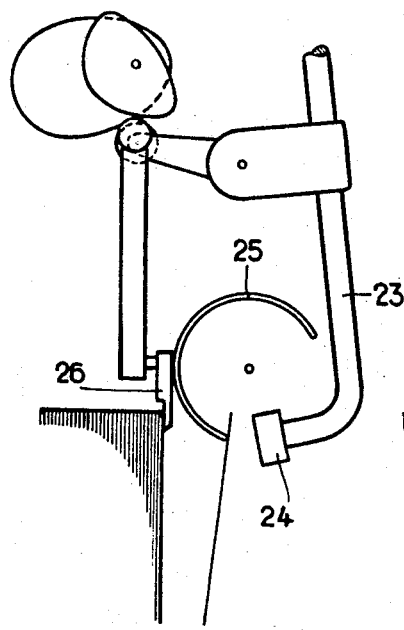

When the first sheet, sucked by the vent 24, slightly moves away from the pile 1, the finger 26 immediately descends to hold back the rest of the pile 1 (FIG. 7). At the same time, the segment 25 will have turned by an amount such that its edge will be near the upper edge of the seized sheet.

As the aforesaid motions proceed (FIG. 8), finger 26 blocks the pile completely and the sheet withdrawn therefrom moves away with the suction duct 24. Now, the segment edge almost contacts the back of the sheet.

The suction is then suppressed, and the suction vent moves away from the sheet in order to permit free passage thereof (FIG. 9) while segment 25 now contacts the sheet and pushes it forward. The finger 26 now begins its ascending motion to permit gripping the next sheet.

Figure 10:
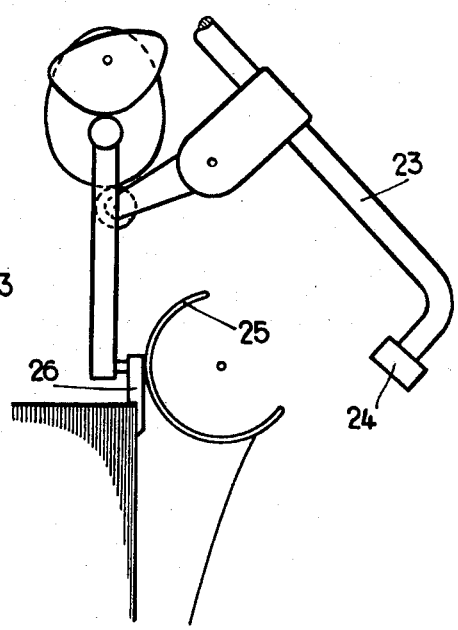

As seen in FIG. 10, the arm 23 and the suction vent 24 are farthest from the trajectory of the sheet. The segment 25 finishes pushing the sheet forward, bringing it near the position 1a of FIG. 1, whereat the second conveying and folding back mechanism engages the sheet, as will be described subsequently.

It should be noted that, in FIGS. 1 and 3, the position of all the already described members is adjustable, so as to be adapted to the widely varying sizes of sheets.

In height, the assembly can be raised or lowered with the bearing girder 10 which is slidable along the lateral girders 6, 6'. Laterally, the members which hold back, seize and remove the sheets can slide along the girder 10 and the shafts 18, 32 and 38.

It is evident that blocking means which determine the various permissible positions will be provided. They are not represented, however, in order to avoid complicating the drawing.

Finally, it is also obvious that girder 10 will bear at least two groups of assemblies like those of FIGS. 6 and 10 for retaining and displacing the sheets and that, for large sizes, one of them will be placed near each lateral edge of the pile. For very small sheets, it is possible to use only one assembly which can be placed at the center of the pile.

Furthermore, FIGS. 1 and 3 show a side rule 39 connected to a rod 40 so as to be adjustable relative to the girder 10. There will be a similar rule facing the opposite pile face, these rules being used to center and maintain the pile.

The ends of the shafts 18, 32 and 38 are pivotably secured in end plates 41 (FIG. 3) which are rigid with girder 10 and slidable on shaft 16. Driving gears 42 are supported on plate 41.

The sheet conveying and folding back mechanism is clearly visible in FIGS. 1 and 2. Only one unit of such mechanism will be described, there being at least two units in the case of large sheets. Each unit is adjustable in a manner similar to the suction mechanism, by making use of similar means.

On the cross girder 11, located opposite the cross girder 10, is a bracket 43 extending towards the sheet pile 1.

The bracket 43 receives a shaft 19 and bears three chain wheels 44, 45, 46, and is integral with a fourth chain wheel 47 which is slidably mounted on the shaft 19 which drives it in rotation.

A chain 48 couples the wheels 46, 47 to drive the wheel 44 which is rotative with wheel 46.

The wheel 45 is supported from bracket 43 by an arm 49 which places the wheel 45 lower than the bracket 43, and two wheels 44, 45 being in a common vertical plane which is perpendicular to the plane in which the sheets are withdrawn from the pile 1. An endless chain 50 connects wheels 44 and 45, and lies in the plane thereof. The chain 50 has reaches which are inclined at an angle of about 45°, and the chain is driven in the direction of the arrow in FIG. 1, such that the lower reach moves downwardly and away from the pile.

The endless chain 50 bears arms or blades 51 regularly spaced on its periphery. The blades each have a hooked end which is not absolutely necessary in all cases. The blades pass into the trajectory of the upper edge of the sheets separated from the pile by the separating mechanism.

Like dredger buckets which collect materials in their course, the arms or blades 51 support the sheets during their passage and deposit them on the conveying member. This operation is clearly seen in positions 1b and 1h in FIG. 1.

The accuracy of this operation is insured by auxiliary means made up of a shaft or rod 21, which is driven in rotation in the tipping direction of the sheets. The rod 21 extends over the bottom of the sheets, the lower edge of each of which comes in turn in contact with rod 21. The rod 21 as it turns removes the base of the first sheet on the pile by frictional contact therewith. The rod 21 can be provided with a rough surface or be formed with grooves or corrugations to facilitate the removal of the base of the sheets from the pile and its subsequent deposit onto the conveying member. The rod 21 is driven from a worm 52 on the shaft 16'.

In addition to the finger 26 retaining the top of the sheets, the sheets will advantageously be retained laterally, at least for large sizes, by non-retractable fingers such as 53, overlapping very slightly on the sheets, so that they escape therefrom by slight flexure when their inclination increases. These lateral fingers are mounted for lateral and vertical adjustment.

Since the slight inclined position of the pile is insufficient to cause it to advance by itself, in particular to apply the base of the first sheet constantly against the rod 21, thin straps 54 in the form of an endless conveyor are provided, whose upper reach engages the undersurface of the pile and facilitates its feeding.

As seen in FIG. 4, it is preferable to provide that these straps be of adjustable position.

This is essential in the case of cut-out sheets, having for instance, the profile of sheet 55 of FIG. 4.

The lower edge of the sheet is not rectilinear, but resembles a staircase, the portion of edge 55' being at a level higher than that of the portion 55''.

The straps 54, as already mentioned, will for this reason be placed at 54' and 54'' respectively.

Both straps 54' and 54'' are driven from driving means occupying laterally an invariable position (for instance, member 22 at the left of FIG. 4). The driving connection is effected by means of expanding cardan joints 56 and 57, making it possible to be adapted at the same time to the profile and the height of the sheets.

A transverse bar 58 and rods 59, 60 permit the aforementioned adjustments. The bar 58 also bears rods such as 61 supporting the lower lateral guides 62 of the pile.

Finally, FIG. 4 shows the shaft 16 which is symmetrical to shaft 16', as well as the disposition of the shaft or rod 21 facilitating the tipping of the sheets.

It is understood that all the mentioned driving organs whatsoever are, as appears from the description, kinematically coupled, which makes it possible, as this is indispensible, to cause them all to work in perfect synchronism.

There will next be explained, when considering FIG. 5, the action necessary when the sheet size is changed. This figure represents the distribution of the smallest possible sheet size (at least in respect of height) from the pile 63.

The distribution of the sheets by means of the separating mechanism poses no problem; it is sufficient to lower it to the required height, for which reason it has not been represented, so as to avoid complicating this figure.

Due to the smallness of the sheets, it is on the other hand necessary to modify the dimensions of the arms or blades of the endless chain 50 and to bring the latter nearer to the pile.

This approximation will be carried out modifying the pile position, for which reason the frame formed by the girder members 6, 6' and 10 can slide on the lower bars 5. FIG. 1 shows the flanges and the base 64 allowing this displacement.

On the other hand, the girders 11 and all the members which it bears, will be lowered to the lower position in FIG. 5 and smaller elements 51' will be substituted for the long and hooked arms or blades 51 of the first embodiment. This substitution is easy, either by providing sets of chains with blades adaptable to the various sheet sizes or a chain with replaceable blades.

Finally, the supports 4 in FIG. 1 are removed, and the guides 3 for the tappets 2 of the conveying member are brought closer to each other. As it appears, the device lends itself quite well to the handling of sheets of small size, such a sheet being shown in the course of being tipped at 63'.

Thus, the described feeder can be adapted in height as well as in width without difficulty to sheets of various sizes.

Figure 11:
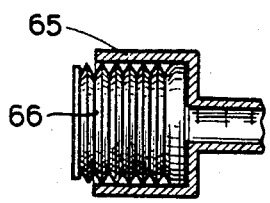
FIGURES 11 and 12 show a detail of the suction mechanism on a larger scale.

In the case of large sheets, their inclination while they are led by the suction vent 24 is small, but this angle increases considerably with sheets of small sizes. At such inclinations, the application of the sheet edge against the suction vent is no longer accurately possible. It is for this reason that the vent represented in FIGS. 11 and 12 has been constructed and shown on a larger scale.

Figure 12:
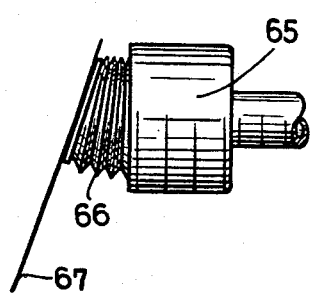

In the body of the sucking vent, a protruding accordion-like member 66 is secured in sealed relation. FIG. 12 shows how this member 66 makes it possible to retain a sheet 67 which forms a substantial angle with the plane of the rigid aperture of the body 65 of the sucking vent.

The feeder according to the invention affords appreciable advantages.

The feeding of the sheets from the side of the machine and not on end, allows, in consideration of a given maximum size, to work with double yield since the sheet presents, in the conveying direction, a dimension no more than half the maximum size. Indeed, it is possible to place two piles side by side and make the sheets thereof tip simultaneously by providing a double number of feeding tappets. Thus the machine admits two sheets within the time it normally received only one. According to this principle, it could even receive three or more sheets at one time. It is sufficient that there be as many separating mechanisms and folding down mechanisms as there are piles laid side by side.

Nothing interferes with the provision of a considerable working speed, since the sheets fall one by one between the tappets which introduce them into the processing machine and this without it being necessary to use any transfer device with its attendant loss of time.

The processed pieces are in general paper or cardboard having notches between which are formed flaps. Contiguous pieces can become interengaged when they are removed from a pile by sliding on one another. The tipping movement according to the invention, wherein the sheets move away from each other without sliding, avoids any interengagement.

Finally, it is worthy of note that even though the sheets are shown in FIG. 1 to be bent due to the sheet material being relatively thin and flexible, it is obvious that the material can be rigid without any difficulty in its tipping or handling. Such rigid material may be, for instance, pieces cut from corrugated cardboard.

The shaft 21 which contributes to the tipping and particularly to the separation of the base of the sheets, will be advantageously connected kinematically through driving means, so as to make it possible to vary its rotatory speed according to the features of the processed sheets.

What is claimed is:

1. A device for successively feeding sheets to a conveyor from a pile which is supported on edge, said device comprising means for supporting a pile of sheets on edge such that said sheets are slightly inclined with the vertical, a separating mechanism including suction means for engaging the first sheet in said pile at the upper edge thereof to withdraw it from the pile and tilt it about its lower edge to a predetermined position in which the angle of inclination of the sheet is increased, after which the sheet is released and allowed to fall freely, an endless conveyor including a plurality of spaced protruding blade members thereon, said conveyor being disposed adjacent the pile such that the blade members pass in the path of the falling sheets and engage successive sheets to support the same and gradually lower the same to horizontal position, and horizontal conveyor means for receiving the sheets and advancing the same.

2. A device as claimed in claim 1, wherein said endless conveyor has a lower reach which forms an angle of about 45° with the vertical and travels downwardly and away from the pile.

3. A device as claimed in claim 2, comprising means supporting the endless conveyor and the separating mechanism for respective vertical adjustment to enable operation with sheets of varying size.

4. A device as claimed in claim 1, comprising a framework including two adjustably spaced girders, transverse bearing members supported from respective girders for vertical adjustment, one bearing member slidably supporting the separating mechanism for transverse adjustment, the other bearing member slidably supporting the endless conveyor for transverse adjustment.

5. A device as claimed in claim 1, comprising means on said one girder for supporting and guiding the pile of sheets and including a member on which the pile rests having an inclination with the horizontal.

6. A device as claimed in claim 1 comprising drive shafts for operating the endless conveyor and the separating mechanism respectively, said drive shafts extending along respective girders, and a common driven shaft coupled to the drive shafts for driving the same.

7. A device as claimed in claim 1 comprising rotatable means disposed at the lower edge of the pile of sheets for engaging the lower edge of the first sheet and separating said sheet from the rest of the pile by frictional contact.

8. A device as claimed in claim 1, comprising a further conveyor means for supporting the sheets of the pile on their lower edges for urging the sheets forwardly in the direction of withdrawal thereof from the pile.

9. A device as claimed in claim 8, wherein said further conveyor means comprises a plurality of conveyors which are adjustable in height and spacing for engaging the lower edges of the sheets of the pile at a plurality of locations.

10. A device as claimed in claim 1, wherein said blade members are replaceably mounted on the endless conveyor.

11. A device as claimed in claim 1, wherein said separating mechanism comprises a reciprocally movable finger which retains the pile at the upper edge of the front face of the first sheet, said suction means comprising a suction vent member which is movably mounted relative to the pile to withdraw the sheets one by one at their upper edges when the movable finger is retracted from its position in front of the pile.

12. A device as claimed in claim 11, wherein said suction vent member comprises a flexible, deformable projection having a rim which remains in contact with the sheet as it undergoes tilting movement.

13. A device as claimed in claim 1, wherein at least one additional pile of sheets is provided, the device further comprising a separating mechanism and an endless conveyor for each additional pile.

14. A device as claimed in claim 1, wherein the device comprises a second separating mechanism and a second endless conveyor, the separating mechanisms and endless conveyors being disposed at the lateral edges of the sheets of the pile.

References Cited

UNITED STATES PATENTS 2,915,308   12/1959   Matzen _____ 271—5

EDWARD A. SROKA, *Primary Examiner.*